United States Patent [19]

Sydansk et al.

[11] Patent Number: 4,722,397

[45] Date of Patent: Feb. 2, 1988

[54] WELL COMPLETION PROCESS USING A POLYMER GEL

[75] Inventors: Robert D. Sydansk, Littleton, Colo.; Lyndon C. Ibele, Midland, Tex.

[73] Assignee: Marathon Oil Company, Findlay, Ohio

[21] Appl. No.: 945,410

[22] Filed: Dec. 22, 1986

[51] Int. Cl.$^4$ ............................................. E21B 33/138
[52] U.S. Cl. ...................................... 166/295; 166/50; 166/294; 166/300; 523/130
[58] Field of Search ................ 166/50, 270, 294, 295, 166/300; 405/264; 523/130, 132

[56] References Cited

U.S. PATENT DOCUMENTS

| Re. 32,114 | 4/1986 | Argabright et al. ................ 166/252 |
| 2,368,424 | 1/1945 | Reistle, Jr. ........................ 166/295 X |
| 2,556,169 | 6/1951 | Crouch et al. ..................... 166/295 |
| 2,562,866 | 7/1951 | Kurtz, Jr. et al. ................ 166/295 X |
| 2,792,893 | 5/1957 | Keller, Jr. et al. ................ 166/295 |
| 3,126,959 | 3/1964 | Ortloff ............................. 166/295 X |
| 3,749,172 | 7/1973 | Hessert et al. .................... 166/295 X |
| 3,978,928 | 9/1976 | Clampitt ........................... 166/294 |
| 4,390,067 | 6/1983 | Willman ........................... 166/50 X |
| 4,444,265 | 4/1984 | Schmidt ............................ 166/50 X |
| 4,607,888 | 8/1986 | Trent et al. ....................... 166/50 X |
| 4,644,073 | 2/1987 | Mumallah et al. ............. 252/8.554 X |

OTHER PUBLICATIONS

Shuttleworth and Russel, *Journal of the Society of Leather Trades' Chemists*, "The Kinetics of Chrome Tannage Part I.", U.K., 1965, vol. 49, pp. 133–154; Part III., U.K., 1965, vol. 49, pp. 251–260; Part IV., U.K., 1965, vol. 49, pp. 261–268.

Von Erdman, Das Leder, "Condensation of Mononuclear Chromium (III) Salts to Polynuclear Compounds," Eduard Roether Verlag, Darmstadt, Germany, 1963, vol. 14, p. 249.

Udy, Marvin J., *Chromium, Volume 1: Chemistry of Chromium and Its Compounds*, Reinhold Publ. Corp., N.Y., 1956, pp. 229–233.

Cotton and Wilkinson, *Advanced Inorganic Chemistry* 3rd Ed., John Wiley & Sons, Inc., N.Y., 1972, pp. 836–839.

*Primary Examiner*—George A. Suchfield
*Attorney, Agent, or Firm*—Jack L. Hummel; Rodney F. Brown

[57] ABSTRACT

An uncased wellbore penetrating a subterranean hydrocarbon-bearing formation is sealed by forming a gel at the open wellbore face comprising a high molecular weight, water-soluble carboxylate-containing polymer and a chromic carboxylate complex crosslinking agent. The gel components are combined at the surface and injected into the wellbore to form the continuous single-phase gel in situ.

42 Claims, No Drawings

WELL COMPLETION PROCESS USING A POLYMER GEL

BACKGROUND OF THE INVENTION

1. Technical Field

The invention relates to a well completion process and more particularly to a well completion process wherein the well penetrates a subterranean hydrocarbon-bearing formation.

2. Description of Related Art

Well completion is a comprehensive term encompassing a number of operations performed in a hydrocarbon wellbore, after drilling part or all of the wellbore, but before the well is put into service as a production or injection well. A common well completion operation is to place a metal casing in a newly drilled wellbore and set the casing with cement to, inter alia, prevent the unwanted production of hydrocarbon gases, hydrocarbon liquids, and/or other fluids from specific intervals of the wellbore.

Horizontal drilling in a hydrocarbon-bearing formation produces a wellbore which cannot be completed by conventional methods. Horizontal wellbores are generally drilled horizontally to follow a hydrocarbon-bearing zone and improve production therefrom. The horizontal wellbore may be formed by drilling horizontally away from a substantially vertical wellbore at a predetermined depth in the vertical wellbore which corresponds to the approximate depth of the producing zone. The horizontal wellbore is initiated or "kicked off" from the vertical wellbore by a radius. A horizontal wellbore may alternatively be initiated at the surface by drilling a radius directly from the surface until a predetermined depth corresponding to the depth of the hydrocarbon-bearing zone is reached. Thereafter, the wellbore is drilled horizontally through the producing zone. In either case, the radius is defined as a relatively short section of sharply curved, nonlinear wellbore which provides a transition from a vertical wellbore or the surface to a horizontal wellbore. The radius is necessitated because it is operationally impractical to initiate a sharp right angle bore hole in the face of a vertical wellbore.

It is difficult, if not impossible, to set casing in the radius and horizontal wellbore because of the sharp curvature in the nonlinear path of the radius and the relative inflexibility of the metal casing tubulars. Thus, the radius and horizontal wellbore are often maintained as uncased open holes, into which unwanted fluids are free to migrate from the surrounding rock.

A well completion process is needed which seals an uncased open wellbore to prevent the migration of unwanted fluids into the wellbore. A well completion process is needed which inexpensively and effectively seals a radius or horizontal wellbore deviating downhole from a vertical wellbore.

SUMMARY OF THE INVENTION

The present invention provides a process for well completion and, more specifically, a process for sealing an open hole or uncased section of a wellbore in a subterranean hydrocarbon-bearing formation. The process is particularly applicable to sealing a section of a horizontal wellbore or to sealing a radius, which is a sharply curved, nonlinear section of wellbore initiating a horizontal wellbore from a vertical wellbore or from the surface. After treatment according to the present invention, the sealed section of wellbore is substantially impermeable to the migration of unwanted fluids across its face, yet the sealed section provides a passageway for produced fluids from the production interval or possibly injected fluids into the injection interval.

The objectives of the present invention are achieved by means of a crosslinked polymer gel. The gel contains a high molecular weight, water-soluble carboxylate-containing polymer and a chromic carboxylate complex crosslinking agent. The gel is prepared by forming a uniform gelation solution above ground containing the polymer and crosslinking agent and injecting the solution into the wellbore. The gelation solution sets up in the desired section of the wellbore as a continuous single-phase material which substantially seals the wellbore face without requiring the further injection of any additional components. After well completion, the well may be placed in normal service.

The gel of the present process provides distinct advantages for sealing a wellbore. The gelation solution, as initially injected into the wellbore, is a uniform, relatively nonviscous, liquid solution prepared at the surface which is substantially free of solids. The solid-free solution is able to penetrate and propagate through microvoids extending from the wellbore. This property of the solution provides good penetration, avoids bridging, and reduces fluid loss.

The resulting gel forms a tenacious chemical bond with the material of the wellbore face. The gel is sufficiently elastic to resist cracking and shrinking, yet is sufficiently strong to substantially resist displacement from the wellbore under even extreme operating pressure. The gel is substantially permanent and resistant to in situ degradation. However, if subsequent removal of the gel is desired, it can be dissolved by an external solvent, such as solutions of sodium hypochlorite, hydrogen peroxide, or any other suitable peroxo compound.

The gel employed in the present invention possesses a broad range of highly controllable and predictable set-up times and strengths. The process is applicable to a broad range of temperatures, salinities, rock formations, and environments. The practitioner can customize or tailor a gel for specific operational constraints, downhole characteristics and subsequent performance demands. One can predetermine the gelation rate and resultant gel strength and stability which are required of a gel to meet the performance demands in the wellbore. Thereafter, a gel having the required predetermined properties is produced under controlled conditions at the surface by utilizing observed correlations between specific controllable gelation parameters and resultant gel properties.

DESCRIPTION OF THE PREFERRED EMBODIMENTS

The present invention is described in the context of specific terms which are defined as follows. The formation consists of two general regions, the "matrix" and "anomalies." An "anomaly" is a volume or void space in the formation having very high permeability relative to the matrix. It is inclusive of terms such as streaks, fractures, fracture networks, vugs, solution channels, caverns, washouts, cavities, etc. The "matrix" is substantially the remainder of the formation volume characterized as essentially homogeneous, continuous, sedimentary reservoir material free of anomalies and often competent.

"Gel" as used herein is directed to a continuous three-dimensional crosslinked polymeric network having an ultra high molecular weight. The gel contains a liquid medium such as water which is confined within the solid polymeric network. The fusion of a liquid and a solid component into a single-phase system provides the gel with a unique phase behavior. Gels employed by the present invention have sufficient structure so as to be substantially impermeable to fluid flow when mature. "Sealing a wellbore" is the rendering of a wellbore face, which is defined to comprise permeable matrix, anomalies, and/or impermeable rock adjacent the wellbore, substantially impermeable to fluid flow.

"Partially gelled" solutions are also referred to herein. A partially gelled solution is at least somewhat more viscous than an uncrosslinked polymer solution. The crosslinking agent of the partially gelled solution has reacted incompletely with the polymer with the result that neither all of the polymer nor all of the crosslinking agent in the gelation solution is totally consumed by the crosslinking reaction. The partially gelled solution is capable of further crosslinking to completion resulting in the desired gel without the addition of more crosslinking agent.

"Crosslinked to completion" means that the gel composition is incapable of further crosslinking because one or both of the required reactants in the initial solution are consumed. Further crosslinking is only possible if either polymer, crosslinking agent, or both are added to the gel composition.

The gel composition utilized in the present invention is comprised of a carboxylate-containing polymer and a crosslinking agent. The carboxylate-containing polymer may be any crosslinkable, high molecular weight, water-soluble, synthetic polymer or biopolymer containing one or more carboxylate species. The average molecular weight of the carboxylate-containing polymer is in the range of about 10,000 to about 50,000,000 and preferably about 100,000 to about 20,000,000, and most preferably about 200,000 to about 15,000,000.

Biopolymers useful in the present invention include polysaccharides and modified polysaccharides. Exemplary biopolymers are xanthan gum, guar gum, carboxymethylcellulose, o-carboxychitosans, hydroxyethylcellulose, hydroxypropylcellulose, and modified starches. Useful synthetic polymers include inter alia acrylamide polymers, such as polyacrylamide, partially hydrolyzed polyacrylamide and terpolymers containing acrylamide, acrylate, and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any conventional method known in the art, but preferably has the specific properties of acrylamide polymer prepared according to the method disclosed by U.S. Pat. No. Re. 32,114 to Argabright et al incorporated herein by reference.

The crosslinking agent is a chrmic carboxylate complex. The term "complex" is defined herein as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The chromic carboxylate complex of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Representative formulae of such complexes include:

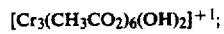

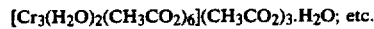

Trivalent chromium and crhomic ion are equivalent terms encompassed by the term chromium III species as used herein. The carboxylate species are advantageously derived from water-solubel salts of carboxylic acids, especially low molecular weight mono-basic acids. Carboxylate species derived from salts of formic, acetic, propionic, and lactic acid, lower substituted derivatives thereof and mixtures thereof are especially preferred. The carboxylate species include the following water-soluble species: formate, acetate, propionate, lactate, lower substituted derivatives thereof, and mixtures thereof. The optional inorganic ions include sodium, sulfate, nitrate and chloride ions.

A host of complexes of the type described above and their method of preparation are well known in the leather tanning art. These complexes are described in Suttleworth and Russel, Journal of The Society of Leather Trades' Chemists, "The Kinetics of Chrome Tannage Part I.," United Kingdom, 1965, v. 49, p. 133–154; "Part III.," United Kingdom, 1965, v. 49, p. 251–260; "Part IV.," United Kingdom, 1965, v. 49, p. 261–268; and Von Erdman, Das Leder, "Condensation of Mononuclear Chromium (III) Salts to Polynuclear Compounds," Eduard Roether Verlag, Darmstadt, Germany, 1963, v. 14, p. 249; and are incorporated herein by reference. Udy, Marvin J., Chromium, Volume 1: Chemistry of Chromium and its Compounds, Reinhold Publishing Corp., N.Y., 1956, pp. 229–233; and Cotton and Wilkinson, Advanced Inorganic Chemistry 3rd Ed., John Wiley & Sons, Inc., N.Y., 1972, pp. 836–839, further describe typical complexes which may be within the scope of the present invention and are incorporated herein by reference. The present invention is not limited to the specific complexes and mixtures thereof described in the references, but may include others satisfying the above-stated definition.

The crosslinking agent may further comprise an inorganic chromium III salt, if it is desired to accelerate the gelation reaction. Exemplary chromium III salts include chromic trichloride, chromic trinitrate, chromic triiodide, chromic tribromide, chromic triperchlorate and mixtures thereof. Increasing the relative concentration of chromium III salt generally accelerates the gelation rate.

The gel is formed by admixing the carboxylate-containing polymer and crosslinking agent at the surface to form an injectable gelation solution. Surface admixing broadly encompasses inter alia mixing the solution in bulk at the surface prior to injection or simultaneously mixing the solution at or near the wellhead by in-line mixing means while injecting it. Admixing is accomplished for example by dissolving the starting materials for the crosslinking agent in an appropriate aqueous solvent. Exemplary starting materials include solid $CrAc_3 \cdot H_2O$, $Cr_3Ac_7(OH)_2$ or a solution labeled "Chromic Acetate 50% solution" commercially available, for example, from McGean Chemical Co., Inc., 1250 Terminal Tower, Cleveland, Ohio 44113, U.S.A. The crosslinking agent solution is then mixed with an aqueous polymer solution to produce the gelation solution. Among other alternatives, the starting materials for the crosslinking agent can be dissolved directly in the aqueous polymer solution to form the gelation solution in a single step.

The aqueous solvent of the gelation solution may be fresh water or a brine having a total dissolved solids concentration up to the solubility limit of the solids in water. Inert fillers such as crushed or naturally fine rock material or glass beads can also be added to the gelation solution to reinforce the gel network structure although a solid-free gelation solution is preferred.

The present process enables the practitioner to customize or tailor-make a gel having a predetermined gelation rate and predetermined gel properties of strength and stability from the above-described composition. The gelation rate is defined as the degree of gel formation as a function of time or, synonymously, the rate of crosslinking in the gelation solution. The degree of crosslinking may be quantified in terms of gel viscosity and/or strength. Gel strength is defined as the coherence of the gel network or resistance to deformation under external forces. Stability is defined as either thermal or phase stability. Thermal stability is the ability of a gel to withstand temperature extremes without degradation. Phase stability is the ability of a gel to resist syneresis which can detract from the gel structure and performance.

Tailor-making or customizing a gel in the manner of the present invention to meet the demands of a particular cementing application is provided in part by correlating the independent gelation parameters with the dependent variables of gelation rate and resultant gel strength and stability. The independent gelation parameters are the surface and in situ gelation conditions including: temperature, pH, ionic strength and specific electrolytic makeup of the solvent, polymer concentration, ratio of the weight of polymer to the combined weight of chromium III and carboxylate species in the mixture, degree of polymer hydrolysis, and average molecular weight of the polymer.

The operable ranges of the gelation parameters are correlated with the dependent variables of gelation rate and resultant gel properties by means including qualitative bottle testing and quantitative viscosimetric analysis. The operable ranges of a number of gelation parameters and their correlation with the dependent variables are described below.

The lower temperature limit of the gelation solution at the surface is the freezing point of the solution and the upper limit is essentially the thermal stability limit of the polymer. The solution is generally maintained at ambient temperature or higher at the surface. The temperature may be adjusted by heating or cooling the aqueous solvent. Increasing the temperature within the prescribed range increases the gelation rate.

The initial pH of the gelation solution is within a range of about 3 to 13 and preferably about 6 to 13. Although gelation can occur at an acidic pH, lowering the initial pH of the solution below 7 does not favor gelation. The initial pH of the solution is most preferably alkaline, i.e., greater than 7 to about 13. Increasing the pH within the prescribed range increases the rate of gelation.

The polymer concentration in the solution is about 500 ppm up to the solubility limit of the polymer in the solvent or the rheological constraints of the polymer solution, preferably about 1000 to about 200,000 ppm, and most preferably about 3000 to about 100,000 ppm. Increasing the polymer concentration increases the gelation rate and ultimate gel strength at a constant rage of polymer to crosslinking agent.

The ionic strength of the solvent can be from that of deionized distilled water to that of a brine having an ion concentration approaching the solubility limit of the brine. Increasing the ionic strength of the solution can increase the gelation rate.

The weight ratio of polymer to chromium III and carboxylate species comprising the mixture is about 1:1 to about 500:1, preferably about 2.5:1 to about 100:1, and most preferably about 5:1 to about 40:1. Decreasing the ratio generally increases the gelation rate and up to a certain point generally increases the gel strength, especially at a constant high polymer concentration.

Where an acrylamide polymer is employed, the degree of hydrolysis is about 0 to 60% and preferably about 0 to 30%. Within the preferred range, increasing the degree of hydrolysis increases the gelation rate. Increasing the molecular weight of the polymer increases the gel strength.

It is apparent from these correlations that one can produce gels across a very broad range of gelation rates and gel properties as a function of the gelation conditions. Thus, to effect optimum well completion according to the present process, the practitioner predetermines the gelation rate and properties of the resultant gel which meet the demands of the given wellbore and thereafter produces the gel having these predetermined characteristics. The demands of the wellbore include the in situ gelation conditions such as temperature, connate water properties, area and nature of the wellbore face including anomalies, and the pressure drop as well as the post treatment conditions such as injection and production pressures. Analytical methods known to one skilled in the art are used to determine these demands which provide criteria to predetermine the gelation ratio and resultant gel properties in the manner described above and continuing hereafter.

The gelation rate is advantageously sufficiently slow to enable preparation of the gelation solution at the surface and injection of the solution as a uniform slug into the wellbore. Too rapid a gelation rate produces excessive gelation of the solution at the surface which results in a solution that may be difficult, if not impossible, to inject into the wellbore due to its rheological properties. At the same time, the gelation rate must be sufficiently rapid to enable completion of the reaction within a reasonable period of time so that the well may be activated after completion without significant loss of service.

The solution may be substantially ungelled or partially gelled before reaching the wellbore face. Thus, the gelation solution is sufficiently fluid to enable placement at the wellbore face. The term "placement of the solution at the wellbore face" comprises any or all of the following conditions: coating the wellbore face, penetrating permeable portions of the wellbore face to some extent, and filling anomalies in the wellbore face. Once in place at the wellbore face, the solution advantageously gels to completion to form a substantially impermeable seal.

The amount of solution injected into the formation is a function of the area of wellbore face to be sealed, the degree of penetration into the permeable face, and the volume and nature of the anomalies in the face. One skilled in the art can determine the required amount of a gel for a given wellbore to be sealed. If placement of the gelation solution in only a portion of the wellbore is desired, zone isolation means such as packers and the like may be employed.

The injection rate is a function of the gelation rate and operational constraints of injection pressure and pumping limits. The required injection rate is fixed such that all of the solution can be practically injected into the wellbore before it becomes unpumpable. The gelation time of the gel ranges from near instantaneous up to 48 hours or longer. Longer gelation times are limited by practical considerations of lost production when injection and production wells are shut in.

Gels having a predetermined gelation rate and resultant gel properties to meet the demands of a given well are produced by adjusting and setting the surface gelation conditions as they correlate to the gelation rate and gel properties. Accordingly, the gels are produced in a manner which renders them insensitive to most extreme formation conditions. The gels can be stable at formation temperatures as high as 130° C. or more and at any formation pH contemplated. The gels are relatively insensitive to the stratigraphy of the rock, and other materials and chemicals employed in well completion operations. The gels can be employed in carbonate and sandstone strate and unconsolidated or consolidated strata having varying mineralogy. Once the gels are in place, it is extremely difficult to displace the gels by physical or chemical means other than total destruction of the crosslinked network. The gels may be reversible on contact with a solvent, such as hydrogen peroxide or sodium hypochlorite, but are substantially insoluble in the formation fluids.

The strength of the gel can vary from an elastic jelly-like material to a more rigid rubber-like material. The stronger materials are generally preferred where extreme drawdown pressures are encountered during production of a well or where extreme injection pressures are encountered during injection of fluids into a well which could cause a weak gel to fail. Of the synthetic polymers, PA is often preferred for such formulations because it has a relatively slow gelation rate which enables one to inject it into a volume before it sets up.

The process is applicable to sealing most any uncased, open wellbore and is particularly applicable to sealing a nonlinear wellbore or other wellbore, which is difficult or impossible to case, such as a horizontal wellbore and/or its radius. There are a number of scenarios for implementing the present process in such wellbores, including (1) drilling a radius, sealing the radius, and thereafter drilling the horizontal wellbore beyond the radius; (2) drilling the radius followed by the horizontal wellbore, isolating the horizontal wellbore, and sealing only the radius; or (3) drilling the radius and horizontal wellbore, sealing both wellbores simultaneously, and thereafter perforating through a selected section. Sealing is effected by injecting only a sufficient amount of gelation solution to layer the wellbore face or injecting an amount of gelation solution to fill all or part of the wellbore and thereafter drilling out the setup gel plugging the wellbore while leaving a layer of gel at the wellbore face or displacing the gel before it sets up with a displacement fluid, such as water or a viscous polymer solution, while leaving a layer of gel at the wellbore face. These and other scenarios are possible within the scope of the present invention.

The following example demonstrates the practice and utility of the present invention but is not to be construed as limiting the scope thereof.

EXAMPLE

A radius approximately 12 meters in length followed by a horizontal wellbore are drilled from an existing abandoned producton well in a highly-fractured West Texas carbonate formation. The well is barely economic because of excessive and undesirable gas production. Gas invades the well from a gas cap, through fractures, and across the wellbore face of the uncased open-hole radius. The well produces about 6400 liters of oil per day at a gas-oil ratio of about 9,000.

A second very similar radius and horizontal wellbore are drilled in the same West Texas field. The 12-meter radius is sealed with about 52,000 liters of a gel which coats the face and fills the surrounding fractures. The gel is formed in situ from a 2.2% by weight polyacrylamide gelation solution in fresh water. The molecular weight of the polyacrylamide is about 11,000,000. A crosslinking agent is also in the gelation solution at a polymer to crosslinking agent weight ratio of 20:1. The crosslinking agent is a mixture of chromic acetate complex and chromic trichloride in a weight ratio of 19:1. After the gelation solution is injected into the wellbore, 1.0 tubing volume of a 2.2% by weight polyacrylamide solution without a crosslinking agent is injected into the wellbore to displace the gelation solution filling the wellbore into the fractures. The well is shut in for 16 hours to allow the gel to cure at the formation temperature of about 30° C. Thereafter, 58 meters of uncased opne-hole horizontal wellbore is drilled. The resulting well produces about 50,000 liters of oil per day and about 1700 liters of water per day at a gas-oil ratio of 231 and an 82 kPa drawdown pressure.

While the foregoing preferred embodiments of the invention have been described and shown, it is understood that the alternatives and modifications, such as those suggested and others, may be made thereto and fall within the scope of the invention.

We claim:

1. A wellbore completion process for sealing an uncased face of a wellbore in fluid communication with a subterranean hydrocarbon-bearing formation below an earthen surface, comprising:
   (a) admixing a gelation solution at the surface consisting essentially of a water-soluble carboxylate-containing polymer, a complex capable of crosslinking said polymer and formed of at least one chromic species and at least one acetate species, and a solvent for said polymer and said complex;

(b) injecting said gelation solution into said wellbore;

(c) placing said gelation solution at said wellbore face; and (d) crosslinking said gelation solutio to substantial completion at said wellbore face to form a nonflowing crosslinked polymer gel which substantially seals said well-bore from fluid intrusion across said face while allowing fluid to flow through said wellbore.

2. The process of claim 1 wherein the weight ratio of said polymer to said complex in said gelation solution is about 2.5:1 to about 100:1.

3. The process of claim 1 wherein said carboxylate-containing polymer is an acrylamide polymer.

4. The process of claim 1 wherein said gelation solution is placed at said wellbore face by injecting a displacement fluid into said wellbore after injecting said gelation solution.

5. The process of claim 4 wherein said displacement fluid is a polymer solution.

6. The process of claim 1 wherein said uncased wellbore is a nonlinear wellbore.

7. The process of claim 6 wherein said nonlinear wellbore is a radius.

8. The process of claim 1 wherein said uncased wellbore is a horizontal wellbore.

9. A wellbore completion process for sealing an uncased face of a wellbore in a fluid communication with a subterranean hydrocarbon-bearing formation below an earthen surface, comprising:

(a) admixing a gelation solution at the surface consisting exxentially of a water-soluble carboxylate-containing polymer, a complex capable of crosslinking said polymer and formed of at least one chromic species, at least one acetate species, and at least one species selected from the group consisting of electronegative oxygen species, electronegative hydroxide species, inorganic monovalent ions, inorganic divalent ions, water molecules, and mixtures thereof, and a solvent for said polymer and said complex;

(b) injecting said gelation solution into said wellbore;

(c) placing said gelation solution at said wellbore face; and (d) crosslinking said gelation solution to substantial completion at said wellbore face to form a nonflowing crosslinked polymer gel which substantially seals said wellbore from fluid intrusion across said face while allowing fluid to flow through said wellbore.

10. The process of claim 9 wherein the weight ratio of said polymer to said complex in said gelation solution is about 2.5:1 to about 100:1.

11. The process of claim 9 wherein said carboxylate-containing polymer is an acrylamide polymer.

12. The process of claim 9 wherein said gelation solution is placed at said wellbore face by injecting a displacement fluid into said wellbore after injecting said gelation solution.

13. The process of claim 12 wherein said displacement fluid is a polymer solution.

14. The process of claim 9 wherein said uncased wellbore is a nonlinear wellbore.

15. The process of claim 14 wherein said nonlinear wellbore is a radius.

16. The process of claim 9 wherein said uncased wellbore is a horizontal wellbore.

17. A wellbore completion process for sealing an uncased face of a wellbore in fluid communication with a subterranean hydrocarbon-bearing formation below an earthen surface, comprising:

(a) admixing a gelation solution at the surface consisting essentially of a water-soluble carboxylate-containing polymer, an inorganic chromic salt, a complex capable of crosslinking said polymer and formed of at least one chromic species, at least one acetate species, and at least one species selected from the group consisting of electronegative oxygen species, electronegative hydroxide species, inorganic monovalent ions, inorganic divalent ions, water molecules, and mixtures thereof, and a solvent for said polymer, said inorganic chromic salt, and said complex;

(b) injecting said gelation solution into said wellbore;

(c) placing said gelation soluton at said wellbore face; and (d) crosslinking said gelation solution to substantial completion at said wellbore face to form a nonflowing crosslinked polymer gel which substantially seals said wellbore from fluid intrusion across said face while allowing fluid to flow through said wellbore.

18. The process of claim 17 wherein the weight ratio of said polymer to said complex in said gelation solution is about 2.5:1 to about 100:1.

19. The process of claim 17 wherein said carboxylate-containing polymer is an acrylamide polymer.

20. The process of claim 17 wherein said gelation solution is placed at said wellbore face by injecting a displacement fluid into said wellbore aafter injecting said gelation solution.

21. The process of claim 20 wherein said displacement fluid is a polymer solution.

22. The process of claim 17 wherein said uncased wellbore is a nonlinear wellbore.

23. The process of claim 22 wherein said nonlinear wellbore is a radius.

24. The process of claim 17 wherein said uncased wellbore is a horizontal wellbore.

25. A wellbore completion process for sealing an uncased face of a wellbore in fluid communication with a subterranean hydrocarbon-bearing formation below an earthen surface, comprising:

(a) admixing a gelation solution at the surface consisting essentially of a water soluble carboxylate-containing polymer, an inorganic chromic salt, a complex capable of crosslinking said polymer and formed of at least one chromic species and at least one acetate species, and a solvent for said polymer, said inorganic chromic salt, and said complex;

(b) injecting said gelation solution into said wellbore;

(c) placing said gelation solution at said wellbore face; and (d) crosslinking said gelation solution to substantial completion at said wellbore face to form a nonflowing crosslinked polymer gel which substantially seals said wellbore from fluid intrusion across said face while allowing fluid to flow through said wellbore.

26. The process of claim 25 wherein the weight ratio of said polymer to said complex in said gelation solution is about 2.5:1 to about 100:1.

27. The process of claim 25 wherein said carboxylate-containing polymer is an acrylamide polymer.

28. The process of claim 25 wherein said gelation solution is placed at said wellbore face by injecting a displacement fluid into said wellbore after injecting said gelation solution.

29. The process of claim 28 wherein said displacement fluid is a polymer solution.

30. The process of claim 25 wherein said uncased wellbore is a nonlinear wellbore.

31. The process of claim 30 wherein said nonlinear wellbore is a radius.

32. The process of claim 25 wherein said uncased wellbore is a horizontal wellbore.

33. a process for drilling and completion of a radius and a horizontal wellbore in fluid communication with a subterranean hydrocarbon-bearing formation below an earthen surface, comprising:
  (a) drilling said radius below said earthen surface to about a depth of sadi hydrocarbon-bearing formation;
  (b) admixing a gelation solution at the surface comprising a water-soluble carboxylate-containing polymer and a crosslinking agent capable of crosslinking said polymer, said crosslinking agent comprising a complex containing at least one chromic species and at least one acetate species;
  (c) injecting said gelation solution into said radius;
  (d) placing said gelation solution at an uncased face of said radius; and
  (e) crosslinking said gelation solution to substantial completion at said radius face to form a non-flowing crosslinked polymer gel which substantially seals said radius from fluid intrusion across said face while allowing fluid to flow through said radius.

34. The process of claim 33 further comprising drilling said horizontal wellbore from said sealed radius through said hydrocarbon-bearing formation after step (e).

35. The process of claim 33 further comprising drilling a vertical wellbore to a preselected depth below said earthen surface above the depth of said hydrocarbon-bearing formation, at which depth said drilling of said radius in step (a) is initiated.

36. The process of claim 33 further comprising drilling said horizontal wellbore from said radius through said hydrocarbon-bearing formation after step (a) and isolating said horizontal wellbore from said radius before step (c).

37. The process of claim 33 further comprising drilling said horizontal wellbore through said subterranean hydrocarbon-bearing formation from said radius after step (a) and further substantially simultaneous to steps (c), (d) and (e) injecting said gelation solution into said horizontal wellbore, placing said gelation solution at said horizontal wellbore face, crosslinking said gelation solution to substantial completion at said horizontal wellbore face to form a non-flowing crosslinked polymer gel which substantially seals said horizontal wellbore from fluid intrusion across said face, and further after step (e), perforating a preselected section of said horizontal wellbore to produce hydrocarbons therefrom.

38. The process of claim 33 wherein said gelation solution is injecting into said radius in a volume sufficient to substantially fill said radius, said process further comprising substantially simultaneous to steps (d) and (e), crosslinking said gelation solution to substantial completion in said radius to form a non-flowing crosslinked polymer gel and after step (e) drilling outs said gel in said radius while leaving said gel at said radius face.

39. The process of claim 33 wherein the weight ratio of said polymer to said complex in said gelation solution is about 2.5:1 to about 100:1.

40. The process of claim 33 wherein said complex further comprises a species selected from the group consisting of oxygen species, hydroxide species, and mixtures thereof.

41. The process of claim 33 wherein said carboxylate-containing polymer is an acrylamide polymer.

42. The process of claim 33 wherein said crosslinking agent further comprises an inorganic chromic salt.

* * * * *

UNITED STATES PATENT AND TRADEMARK OFFICE
CERTIFICATE OF CORRECTION

PATENT NO. : 4,722,397

DATED : February 2, 1988

INVENTOR(S) : Robert D. Sydansk et al

It is certified that error appears in the above-identified patent and that said Letters Patent is hereby corrected as shown below:

Col. 3, line 64: Delete "chrmic" and insert --chromic--.
Col. 4, line 31: Delete "crhomic" and insert --chromic--.
Col. 4, line 34: Delete "water-solubel" and insert --water-soluble--.
Col. 5, line 17: Delete "$CrAc_3 \cdot H_2O, Cr_3Ac_7(OH)_2$" and insert --$CrAc_3 \cdot H_2O$, solid $Cr_3Ac_7(OH)_2$--.
Col. 5, line 18: Delete "solution" and insert --Solution--.
Col. 9, line 8: Delete "solutio" and insert --solution--.
Col. 9, line 36: Delete "exxentially" and insert --essentially--.
Col. 10, line 37: Delete "aafter" and insert --after--.
Col. 11, line 18: After "33." delete "a" and insert --A--.
Col. 11, line 23: Delete "sadi" and insert --said--.
Col. 12, line 31: Delete "outs" and insert --out--.

Signed and Sealed this

Twenty-first Day of June, 1988

Attest:

DONALD J. QUIGG

Attesting Officer     Commissioner of Patents and Trademarks